ary Examiner-John C. Bleutge

United States Patent [19]

Glans et al.

[11] Patent Number: 5,070,152

[45] Date of Patent: Dec. 3, 1991

[54] USE OF PHOSPHOROUSTRISLACTAMS AS COMPATIBILIZING AGENTS FOR POLYPHENYLENE OXIDE/POLYESTER BLENDS

[75] Inventors: Jeffrey H. Glans, Somerville; Murali K. Akkapeddi, Morristown, both of N.J.

[73] Assignee: Allied-Signal Inc., Morris Township, Morris County, N.J.

[21] Appl. No.: 676,666

[22] Filed: Mar. 28, 1991

Related U.S. Application Data

[62] Division of Ser. No. 562,355, Aug. 3, 1990.

[51] Int. Cl.[5] .................... C08L 67/02; C08L 69/00; C08L 71/12
[52] U.S. Cl. .................................. 525/397; 525/133; 525/392; 525/394; 525/905
[58] Field of Search ............... 525/133, 392, 394, 397, 525/905

[56] References Cited

FOREIGN PATENT DOCUMENTS 0338268 10/1989 European Pat. Off. .

*Primary Examiner*—John C. Bleutge
*Assistant Examiner*—Thomas Hamilton, III
*Attorney, Agent, or Firm*—Andrew N. Parfomak; Roger H. Criss

[57] ABSTRACT

The invention relates to improved polymer material blends which include the compatibilizing agent, a compound of phosphoroustrislactams which is useful as a compatibilizing agent, between the polymer materials. An exemplary composition comprises one or more polyphenylene oxides, one or more polyesters and the compatibilizing agent comprising phosphoroustrislactams.

9 Claims, No Drawings

USE OF PHOSPHOROUSTRISLACTAMS AS COMPATIBILIZING AGENTS FOR POLYPHENYLENE OXIDE/POLYESTER BLENDS

This application is a division of application Ser. No. 562,355, filed Aug. 3, 1990.

BACKGROUND

1. Field of the Invention

The present invention relates to improving the properties of particular molding compositions, particularly those comprising polyphenylene oxides (also known as polyphenylene ethers) and a polyester through the use of a phosphoroustrislactam as a compatibilizing agent.

2. Description of the Prior Art

Engineered plastics enjoy widespread popularity for the production of articles through the use of molding or casting processes. These engineering plastics are frequently blends of two or more specific constituents which feature specific properties, i.e., toughness, rigidity, chemical resistance, long-term hygrothermal dimensional stability, dielectric strength, and the like. While such engineering plastics comprising two or more specific constituents would optimally exhibit the beneficial properties of each constituent, unfortunately, as is well known to the art, the formation of blended polymeric materials are rarely attained which offer these desirable characteristics of the constituents making up its composition, without simultaneously suffering from some detrimental quality.

Poly(alkylene terepthalates) including poly(ethylene terepthalate), also known to the art by its acronym "PET", and poly(butylene terepthalate), similarly referred to as "PBT" are aromatic polyesters which enjoy frequent use where rigidity, ductility, high melting point and solvent resistance, are required. This is known to the art to be due to the relatively high degree of crystallinity which polyalkylene terephthalates, particularly PBT, exhibit subsequent to cooling from the melt. However, these materials are known have relatively low glass transition temperatures, "$T_g$" and suffer heat distortion under mechanical loads at relatively low temperatures. Further, these materials are also known to suffer from a marked loss in their impact resistance subsequent to annealing or heat ageing, which may be due to subsequent processing of the article during its production, or from prolonged exposure to heat during its use. Blends of poly(phenylene ethers), which are also known to the art as poly(phenylene oxides) and which are commonly referred to as "PPE" or "PPO", and polyesters are expected to have increased heat distorion temperatures due to the high glass transition temperature, (interchangeably referred to as $T_g$) of the PPE.

Polyphenylene ethers, also interchangeably referred to in the art as "polyphenylene oxides" are compounds known to exhibit good performance characteristics in elevated temperatures, or after heat ageing due to the high glass transition temperatures, $T_g$ which such materials typically exhibit. Further, such materials also exhibit good ductility and hydrolytic stability. Compositions comprising PPE and polyesters have been synthesized, and such compositions are described in PCT Application PCT/US/01027 for "Polyphenylene Ether-Polyester Copolymers, Precursors Therefor, Compositions Containing Said Copolymers, And Methods For Their Preparation" which describes a series of functionalizing agents, preferably those selected from among; maleic acid and derivatives thereof, fumaric acid and trimellitic anhydride, which are useful in promoting bonding between the PPE phase and polyester phase in the composition.

A further composition is that described in International Application PCT/US86/01572 for "Solvent-Resistant, Compatible Blends of Polyphenylene Ethers and Linear Polyesters" which describes compatibilized blends which include polyphenylene ether, polystyrene, poly(alkylene dicarboxylate), an elastomereic impact modifier and a further polymer.

A further composition comprising PPE, and a thermoplastic polyester blend containing a large proportion of polycarbonates which is compatibilized through the use of a poly(phenylene) ether is described in U.S. Pat. No. 4,927,881 issued on May 22, 1990.

A still further composition is that described in an application by the same inventors as in the instant application for a U.S. Patent titled "Process for Preparing Graft and Block Copolymers of Polyphenylene Oxides and Polyesters and Copolymers Prepared by said Process" filed on Dec. 4, 1989 and assigned Ser. No. 446,512. Therein is described a composition where a tris(phenyl)phosphite is used as a compatabilizing agent for polyphenylene oxide and polyester resins.

Such methods provide useful molding compositions having good physical properties, but also undesirably produce free phenol during the reaction which is widely regarded as a toxin and requires particular care in order to effect its removal.

The activity in this art, is merely one indication that there remains a need for continued development, and further improved compositions comprising PPE and polyesters. It is to this need, as well as other needs, that the present invention is addressed.

SUMMARY

In one aspect of the invention, there is provided an improvement in blends comprising one or more polyphenylene ethers, and one or more polyesters which is achieved by the inclusion of a phosphoroustrislactam as a constituent used in forming the blend composition. The phosphoroustrislactam acts as a compatibilizing agent between the PPE and the polyester and induces active coupling therebetween, and thereby providing materials which exhibit improved physical characteristics than those provided in the art.

A further aspect of the invention is a method of producing articles comprising improved blends of one or more polyphenylene ethers, and one or more polyesters and at least one phosphoroustrislactam as a compatibilizing agent between the PPE and the polyester.

Further aspects of the invention not particularly recited here will become apparent upon a reading of the accompanying specification of the preferred embodiments and the claims below.

DESCRIPTION OF THE PREFERRED EMBODIMENTS

Polyphenylene ethers suitable for use in the present invention are well known in the art as well as their methods of preparation. What is meant by the term "polyphenylene ether", (also interchangeably referred to as "PPE") is to include not only those compositions of unsubstituted polyphenylene ether, but additional is also to include polyphenylene ethers with various substituents. Further, this definition is meant to include PPE copolymers as well as graft copolymers and block copolymers of alkenyl aromatic compounds, especially vinyl aromatic compounds and a polyphenylene ether.

By way of illustration, and not by limitation, suitable phenol compounds useful for the derivation of PPE therefrom include those represented by formula [1] as follows:

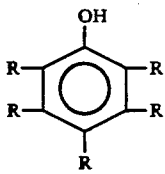  [1]

wherein each R is representative of a monovalent substituent selected from the group consisting of hydrogen, halogen, aromatic hydrocarbon, aliphatic hydrocarbon, as well as hydrocarbonoxy radicals which are free of a tertiary alpha carbon atom and halohydrocarbon and halohydrocarbonoxy radicals free of a tertiary alpha-carbon atom and which comprises as least two carbon atoms between the halogen atom and the phenyl nucleus, and wherein at least one R is hydrogen.

Particular nonlimiting examples of the phenol compounds which are represented by the above formula include:
2,4-dimethyl-phenol,
2,5-dimethyl-phenol,
2,6-dimethyl-phenol,
2-methyl-6-phenyl-phenol,
2,6-diphenylphenol,
2,6-diethylphenol,
2-methyl-6-ethyl-phenol,
the ortho-, meta- and para-cresols,
as well as 2,3,5-trimethylphenol,
2,3,6-trimethylphenol
and 2,4,6-trimethylphenol.

Additionally, two or more phenol compounds may be used in combination to form copolymers.

By means of example and not by way of limitation, several suitable polyphenylene ethers include:
poly(2-methyl-1,4-phenylene)ether,
poly(2,6-diethyl-1,4-phenylene)ether,
poly(2,6-dichloromethyl-1,4-phenylene)ether,
poly(2,3,5,6-tetramethylphenylene)ether,
poly(2,6-dichloro-1,4-phenylene)ether,
poly(2,6-dimethyl-1,4-phenylene)ether,
poly(2,6-dipropyl-1,4-phenylene)ether,
poly(2-ethyl-6-propyl-1,4-phenylene)ether,
poly(3-methyl-1,4-phenylene)ether,
poly(2,3,6-trimethyl-1,4-phenylene)ether,
poly(2-methyl-6,allyl-1,4-phenylene)ether,
poly(2,5-dimethyl-1,4-phenylene)ether,
poly(2,6-diphenyl-1,4-phenylene)ether, as well as other similar compositions not specifically delineated here.

Further, as already has been mentioned, copolymers of the phenol compounds are also contemplated.

Preferably, the polyphenylene ethers will have the formula according to formula [2]:

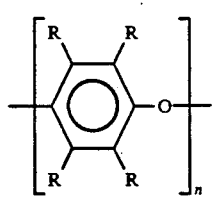  [2]

wherein n has a value of 50 or in excess thereof, and R is consistent with the definition given above. By means of example and not by way of limitation, several polyphenylene ethers suitably represented by the above formula include:
poly(2-ethyl-6-ethoxy-1,4-phenylene)ether,
poly(2-methoxy-6-ethoxy-phenylene)ether,
poly(2,6-dilauryl-1,4-phenylene)ether,
poly(2,6-dibromo-1,4-phenylene)ether,
poly(2,6-diphenyl-1,4-phenylene)ether,
poly(2,6-diethoxy-1,4-phenylene)ether,
poly(2-ethoxy-1,4-phenylene)ether,
poly(2,6-dimethoxy-1,4-phenylene)ether,
poly(2-methyl-6-phenyl-1,4-phenylene)ether,
poly(2,6-dichloro-1,4-phenylene)ether,
poly(2-chloro-1,4-phenylene)ether,
as well as other similar compositions not specifically delineated here.

Methods for the production of PPE are well known to the art, and by way of example, phenols may be oxidized in the presence of an oxygen containing gas and a catalyst which induces oxygen coupling with the phenol. Examples of such suitable catalysts include those comprising a cupric salt, a tertiary amine, and an alkali metal hydroxide, or one comprising a manganese salt and an alcoholate, or a manganese salt and a phenolate. The preferred PPEs are those comprising a lower alkyl group substitution in the positions described as R in formula [2] above, and which include hydroxyl terminal groups in their structure.

The poly(phenylene ether)s used are described as having intrinsic viscosities of 0.51, 0.45, and 0.30 respectively, melt viscosities at 300 deg. C. of 63180, 8900 and 285 respectively, Wt.Avg.Mol.Wt. of 80900, 64400 and 34800 and No.Avg.Mol.Wt. of 12600, 10400 and 4800 respectively. These materials exhibit phenolic hydroxyl concentrations of 0.06, 0.76 and 0.22 meq/g as determined by titration of these constituents with tetra (n-butyl) ammonium hydroxide.

Polyesters which find use with the present invention include thermoplastic polyester resins which are characterized in exhibiting an intrinsic viscosity of 0.3 to 1.0 dl/g when measured in a 60/40 weight percent mixture of phenol/tetrachlorathene and which further include carboxyl or hydroxyl terminal end groups. Optionally, the end groups may be partially capped, such as throught the use of a monoester.

Thermoplastic polyester resins which are preferred for use in conjunction with the instant invention are poly(alkylene terephthalate) resins, including poly(ethylene terephthalate), poly(butylene terephthalate), poly(tetramethylene terephthalate), poly(arylene terephthalate) and copolymers and/or mixtures thereof. As is known to the art, these polyester resins may be obtained through the polycondensation of terephthalic acid, or a lower alkyl ester thereof, and an alkylene diol. By way of example, polyethylene terephthalate or polybutylene terephthalate may be produced by polycondensation of dimethyl terephthalate and ethylene glycol, or 1,4-butane diol after an ester interchange reaction.

Of these, PET is the preferred polyester as it exhibits a high melting point, good crystallinity and good solvent resistance. The amount of polyester and PPE may vary widely, and in general may vary in that the amount of each of these constituents may be present so to comprise between 10 percent to approximately 90 percent of a composition in according with the teaching of the instant invention, which necessitates only that the final composition be partially compatibilized by the use of the phosphoroustrislactams which are incorporated into the compositions. Preferably, the polyester should comprise between about 25% and 75% of a composition, and more preferably, the polyester should comprise between 25% and 60% of the composition. Similarly, the polyphenylene ether should comprise between about 25% and 75% of a composition, and more preferably, the polyphenylene ether should comprise between 25% and 60% of the composition in accordance with the teachings of the present invention.

The phosphoroustrislactams which find use in the present invention is particularly described in a pending U.S. patent application for "PHOSPHOROUSTRISLACTAMS AND METHODS FOR THEIR PRODUCTION", Ser. No. 542,942 filed on June 25, 1991 of the same inventors and assigned to the same assignee as the instant application, the complete contents of which are herein incorporated by reference. The phosphoroustrislactams may be described as compounds in accordance with formula [3], below

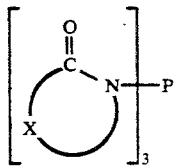

[3]

or alternately, in accordance with formula [4].

[4]

where X represents a chain of $CH_2$ monomer repeat units of at least 1 and including up to 11 $CH_2$ monomer repeat units.

The phosphoroustrislactams are utilized as reactive intermediates which are capable of compatibilizing PPE and the polyester in the composition inducing what is believed to be a coupling reaction between the hydroxyl end group of the PPE with the carboxyl end group of the polyester which results in a block or graft copolymer. Under ideal circumstances, equimolar amounts of hydroxyl terminal groups of a poly(phenylene ether) is reacted with the carboxyl terminal group of a polyester in the presence of a tri(lactamyl)phosphite. The reaction liberates as byproducts equimolar amounts of a caprolactam and phosphorous acid derivatives. Due to the relatively inert nature of these byproducts, the reacted PPE and polyester remains stable, and the remaining water, caprolactam and phosphorous acid derivatives may be removed by conventional methods. One beneficial feature of this reaction is that none of the byproducts of the coupling reaction exhibit presently known toxic characteristics which is in contrast to the use of a tri(phenyl phosphite) which forms phenol comprising compounds as a byproducts of its reaction. Further, it has been found that unlike the use of a tri(phenyl phosphite) which requires that vacuum conditions be used so to remove the produced phenol comprising compounds in order to eliminate the reversibility of the compatibilizing reaction, the use of the phosphoroustrislactams as a compatibilizing agent is not reversible under usual processing conditions.

Various optional ingredients may also be incorporated as constituents into blends in accordance with the present invention in order to impart further specific properties thereto. The use of one such additive, which is a constituent preferentially utilized, is a material which is used to decrease the crystallinity of the polyester component. Examples of such materials include homopolymers and/or copolymers of polycarbonates and polyestercarbonates. Examples of polycarbonate containing polymers and polycarbonates, and polyestercarbonates include but are not limited to poly(methane bis(4-phenyl)carbonate), poly(1,1-ethane bis(4-phenyl)carbonate), poly(2,2-propane bis(4-phenyl)carbonate), poly(1,1-butane bis(4-phenyl)carbonate, poly(2,2-butane bis(4-phenyl)carbonate, poly(1,1-(1-phenylethane) bis(4-phenyl)carbonate), poly(dipenylmethane bis(4-phenyl)carbonate) which can be obtained from commercial sources or prepared by known techniques. Examples of such commercially available materials include the family of polycarbonate materials marketed by the General Electric Co. under the trade name Lexan ®. Further examples of useful polyester carbonates and methods for their production are described in U.S. Pat. Nos. 4,156,069, 4,386,196 and 4,612,362.

Such carbonate containing polymers function in reduction of the crystallinity of the polyester component. In accordance with the teaching of the instant invention, any amount of such carbonate containing polymers which is found to satisfactorally reduce the crystallinity of the polyester component may be used. However, the amount of carbonate containing polymer added is usually from about 5% to about 40% by weight based on the total weight of the polyester, and is preferably from about 5% to about 35% by weight of the polyester, and most preferably between 5% to about 25% by weight of the polyester.

In preferred embodiments of the invention, a polymer exhibiting elastomeric properties may be included where the inclusion of such a polymer provides a beneficial effect upon the impact resistance of materials formed from such a blend. Throughout this specification and the claims, the term "functionalized elastomer" is meant to be understood as the polymer exhibiting elastmeric properties and provind a benficial effect upon the impact resistance of materials as described hereinafter. Such an elastomeric polymer is defined as having an ASTM D-638 tensile modulus of less than about 40,000 psi (276 MPa), and preferably less than about 20,000 psi (138 MPa). Examples of such elastomeric polymers may be block, graft or random copolymers, and can be made of reactive monomers which comprise part of the polymer chains, or grafted, or as branches of the polymer. Some examples of such reactive monomers include dienes, unsaturated carboxylic acids, as well as derivaties thereof, including esters and anhydrides as well as unsaturated epoxide moiety containing constituents. By way of illustration, but not by way of limitation, examples of such useful elstomeric polymers include α-olefin containing copolymers, especially ethylene copolymers, copolymers containing acrylic acid salts, known to the art as "acrylic acid ionomers" which include by way of illustration etylene/methacrylic acid neutralized with sodium, ethylene/maleic anhydride, ethylene/ethyl acrylate, ethylene/glycidyl methacrylate, ethylene/methyl methacrylate and the like. Further examples of elastomeric polymers include natural rubber, nitrile rubber, polyacrylates, butadiene polymers, isobutylene/isoprene copolymers, styrene/ethylene/propylene/diene copolymers, acrylonitrile/styrene/diene copolymers, ethylene/styrene/diene copolymers, butadiene/styrene copolymers, styrene/butadiene/styrene copolymers, acrylonitrile/butadiene/styrene copolymers, acrylic core shell rubbers such as:

methyl methacrylate/butadiene/styrene graft copolymers, polyalkylene oxide elastomers, poly(dimethyl siloxane) rubbers, and the like, poly(chloroprene), acrylonitrile/butadiene copolymers, poly(isobutylene), isobutylene/butadiene copolymers, ethylene/propylene copolymers, polyneoprene, ethylene/propylene/butadiene copolymers, as well as wholly or partially hydrogenated, oxidized or carboxylated derivatives. Useful elastomeric polymers can include monomeric units derived from aromatic vinyl monomers, olefins, acrylic acid, methacrylic acid, and their derivatives. These mateirals may be obtained from commercial sources or produced through techniques known to the art. Further examples of useful elastomeric polymers and methods of their production are described in U.S. Pat. No. 4,315,086 and 4,175,358.

Preferred elastomeric polymers (also known to the art as "rubbers" or "rubbery polymers") are carboxylated or epoxide moiety containing elastomers, including those which are reaction products of rubber with anhydrides, and include maleic anhydrides; reaction products of rubber with glycidyl methacrylates, and subsequent oxidation as may be effected by the use of a permanganate; grafting reactions of the double bonds of unsaturated monomers having pendant carboxylic acid functions such as acrylic acid, methacrylic acid, and the like. Particularly preferred rubbers include maleated rubbers, especially where the rubbers are simple tri-block copolymers of the "A-B-A" structure, or are multiblock copolymers of the "[AB]$_n$" linear or radial type, where "n" is any integer between 2 and 10 inclusive, "A" is representative of a block derived from a polyvinylaromatic monomer such as styrene or vinyl toluene, and "B" is a block derived from a conjugated diene monomer as well as hydrogenated derivatives thereof. Many of these elastomers are commercially available under the trade name Kraton ® from Shell Chemical Co.

The elastomeric material functions to improve the impact resistance of blends according to the invention, and the amount of elastomeric material added may be any amount which provides such an impact resistance improvement ot the blend. Based on the weight of the polyester and the polyphenylene ether, the elastomeric material is present in an amount of between 2.5% and 25%, preferably in an amount between 3% and 18% inclusive, and most preferably form about 5% and 15% by weight on the aforementioned basis.

Other optional constituents which may be incorporated into the blends according to the instant invention include such materials as fillers, impact modifiers, dyes, colorants, pigments, plasticizers, mold release agents, fire retardants, drip retardants, antioxidants, UV stabilizing agents, mold release agents, colorants, antistatic agents, nucleating agents, thermal stabilizing agents, and the like. These optional constituents may be added to the mixture at any appropriate time during the production of the blend, and as they are well known to the art, are not here described with particularity. All of these optional constituents are commercially available.

The compositions according to the instant invention may be made by any technique or process, presently known yet to be developed which will effect an intimate blending of the constituents of the compositions, particularly the PPE, polyester and the phosphoroustrislactam. By way of example, such useful methods include formation of a solution in which the constituents are dissolved, suspended or dispersed in a suitable solvent, after which the solvent is removed from the resultant blend composition by conventional processes in order to form compositions in accordance with the teachings of the instant invention. An alternative technique is by the dry-blending the constituents in a dry particulate form, such as powders, pellets, flakes, prills or the like, and then heated to a temperature equal to or greater than the melting point of either the PPE or the polyester. A further variation on this technique which may be utilized where all of the desired constituents are not available in powder form, is an additional process steps of mixing any liquid constituents or constituents in liquid form, subsequent to dry blending of the constituents, and thoroughly mixing the constituents, as well as removal of excess liquids during processing by well known techniques.

During production of compositions according to the instant invention, it is recognized that acceptable temperatures used in heating the constituents may vary over a wide range, and is dependent upon the constitution of the any particular blend composition. Preferably, the temperature should be at least as high as the melting point of the polyester and the PPE but at the same time, should not be as high as the degradation temperatures of either the PPE or the polyester. In particularly preferred embodiments, the temperature is such that the polyester and PPE will be retained in a molten state sufficiently long to allow for the phosphoroustrislactam to react with either the polyester or PPE and form a block or graft copolymer therewith.

The heating of the constituents may be carried out in any manner whereby the temperature constraints outlined above are achieved. In one contemplated method, the heating step is carried out at a temperature which is equal to or greater than the melting point of the desired resultant composition. In an alternative method, the constituents are heated so that the temperature is increased as a function of time over the course of any heating process to cause the melting of constituents in the manner described in this specification, and to maintain this mixture in a molten state. Other methods not particularly described here, but which may be utilized in forming compositions according to the present invention are contemplated and considered within the scope of the invention.

Pressures are not contemplated to have any critical effect, and can be widely varied without adversely effecting the process of forming the inventive compositions. consequently, heating can be conducted at pressures below, at, or above atmospheric pressure. In preferred embodiments, at least a portion of the heating step is carried out at a reduced pressure so to allow the removal of any volatile constituents or by-products. The production of compositions may be conducted under normal atmospheric conditions, or in the absence of air. Alternately, the production of compositions may be conducted in a controlled atmosphere, such as in the presence of an inert gas, such as argon, nitrogen, carbon dioxide, or other inert gas.

The time needed to react the constituents may vary over a wide range, and is recognized to be a factor of such effects as the polyester and PPE selected, additional constituents selected, the concentration of each of the constituents forming the composition, the temperatures to be used as well as the type of heating step used, as well as the type of reaction vessel and the manner of forming the composition. These are factors which are known in the art as effecting reaction times. In most instances, the reaction time will vary between from about 5 seconds up to about 25 hours, preferably, the reaction times vary between about 30 seconds to about 1 hour.

Preferably, the process of forming compositions in accordance with the instant invention includes a process step of removing any by-products of the reaction, as well as unreacted phosphite compounds. The methods used may be any conventional means which does not adversely effect the composition formed. In preferred embodiments, all or part of the unreacted phosphite compounds are removed as it is believed that such removal enhances the effectiveness of the grafting process and improves the mechanical and other properites of the blend. Ideally, a composition where all of the unreacted phosphite compounds are removed forms the most preferred embodiment of the invention, however it is concurrently recognized that complete removal is not always possible. The removal of another by product, water, also forms a preferred embodiment of the invention and its removal by any techniques not detrimental to the properties of the blend may be used. Preferably, such techniques include formation of the blend under vacuum conditions or under reduced pressures, during any heating step.

The formation of compositions may be carried out in a batchwise fashion, or alternatively in a continuous fashion. In the case of the former, a reaction vessel suitable to contain the constituents and to provide suitable reaction conditions, e.g. heat, temperature, adequate mixing of the constituents, atmosphere may be used, and such vessels include common laboratory glassware and flasks, Banbury mixers, and the like. In the case of the latter, an extruder of the single or multiple screw variety having at least one reaction zone may be utilized, as well as extruders having multiple zones, both in a series arrangement or in a parallel arrangement.

The compositions of the instant invention are suitable for the formation of articles by subsequent molding or forming techniques, including but not limited to compression, injection, extrusion, as well as other techniques not particularly recited here, but which are nonetheless useful in forming formed articles therefrom.

The compositions of the instant invention are useful in all applications wherein polyesters and polyphenylene ethers (polyphenylene oxides) may be used; however, one distinguishing feature of the compositions of the present invention is that in their formation no phenols or phenolic compounds are formed or released.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

In the following embodiments of the invention, it is to be understood that in the description of any composition, all percentages associated with a constituent used to form a composition are to be understood as to be "percentage by weight" of the particular constituent relative to the composition of which it forms a part. Exceptions to this convention will be particularly noted.

For each of the examples, the poly(ethylene terephthalate) used exhibited an intrinsic viscosity of 0.3 to 1.0 dl/g when measured in a 60/40 weight percent mixture of phenol/tetrachlorathene. The poly(phenylene ether)s, or PPEs used were used as described below, and the phosphorous triscaprolactam used was the reaction product of caprolactam and phosphorous trichloride.

EXAMPLES 1-4

For forming Examples 1 through 4, a mixture of 48.5 parts of PET, and 48.5 parts of PPE having, in examples 1 and 3 having an intrinsic viscosity of 0.36 as measured in chloroform, and in examples 2 and 4, having an intrinsic viscosity of 0.46 also as measured in chloroform, were tumble blended together in a sealed container with 3 parts of phosphorous triscaprolactam. Afterwards, each of the mixtures were supplied to the feed hopper placed at the throat of a Killion 1 inch single screw extruder. The extruder barrel has a length to diameter ratio of 30 to 1, and the zones of the barrel were heated to the following temperatures: zone 1, 400 deg. F., zone 2, 500 deg. F., zone 3, 510 deg. F., zone 4, between 520-550 deg. F. The extruder included an injection port located 15.5 inches from the throat of the screw and immediately preceeding a high-compression zone, which zone has a length of 8 inches, and the extruder also included a vacuum port located near the die. The first exit die was maintained at a temperature of 530 degrees F., and the second die was maintained at a temperature of between 480-510 deg. F. The extruder was outfitted with a 2 stage Maddock screw, and throughout the extrusion the rotational speed of the screw was maintained at a constant of 50 RPM. The extrudate exiting the die was in the form of strands having a diameter of ¼ inch, and were quickly passed into a water bath to quench and cool the strands. The mass output of the extruder was determined to be 39 grams/minute. The strands were subsequently pelletized to form a feed stock useful for injection molding. The extrudate so formed was noted to be amber in color. A portion of the pellets so formed was removed, ground to form a fine powder and exhaustively extracted in chloroform in order to remove as much as possible of the unreacted PPE remaining in the extrudate. The resulting powder was dried in a vacuum. The amount of the extractable PPE which was determined for each of the compositions provided an indicator of the relative amount of reacted PPE resulting from the extrusion process.

For the production of a film, the respective compositions which were ground in a mill through a 2 mm screen and dried overnight at 110 deg. C., and afterwards were placed on the Teflon ® coated side of a sheet of aluminum foil of thickness 0.003 inch. A preheated steel plate at approximately 280 deg. C. and having dimensions of 8 inches by 8 inches were used to underlay the non-coated side of the aluminum foil sheet bearing the powder was leveled and then a similiar second piece of Teflon ® coated aluminum foil was placed on the powder so that the powder was contained between the two Teflon ® faces of the two aluminum foil sheets. A second preheated steel plate of like dimensions and at approximately 280 deg. C. was layered in register on the non-Teflon ® coated side of the second sheet of aluminum foil to form a sandwich structure after which the sandwiched structure was inserted into the heated Wabash molding press which throughout the molding operation was maintained at 280 deg. C. After 60 seconds of contact pressure, that is to say 0 psig, the pressure was gradually and continuously increased to 5 tons over a period of 30 seconds in order to improve the flow of the powder. Afterwards, at 90 seconds after the original insertion of the sandwiched structure, the pressure was increased to 50 tons, and there maintained for 90 seconds. Afterwards, the entire assembly was removed and transferred to cooling platens and there maintained under a pressure of 50 tons for a period of between 7-8 minutes. Afterwards, the sandwiched structure was disassembled, and the film structure formed by the compression operation was recovered.

For performing physical testing of the material, the compression molded formed structures noted above were cut into "Type" 4 bars, which were subsequently tested to determine their tensile properties according to ASTM-D 638, and the results are summarized on Table 1 below.

TABLE 1

| Example: | 1 | 2 | 3 | 4 |
|---|---|---|---|---|
| PPE, I.V. in dl/g | 0.36 | 0.46 | 0.36 | 0.46 |
| Tensile Strength, kpsi. | 5.8 | 4.7 | 5.2 | 5.1 |
| Tensile Modulus, kpsi. | 406 | 397 | 385 | 388 |
| Elongation, % | 1.6 | 1.3 | 1.4 | 1.4 |
| % extractable PPE | 39 | 35 | 30 | 28 |
| % reacted | 22 | 30 | 40 | 44 |
| Vacuum | no | no | yes | yes |

COMPARATIVE EXAMPLES C1-C2

Samples consisting of a blend of PPE, PET and no phosphorous triscaprolactam were produced in accordance with the method outlined for forming examples 1 and 2. The compositions consisted of 50 parts PET and 50 parts PPE, having for example C1 an intrinsic viscosity of 0.36, and for example C2 an intrinsic viscosity of 0.46 as measured in chloroform. The constituents were supplied in the form of granular powders which were subsequently tumble blended together and subsequently extruded and the extrudate compression molded into "Type 4" tensile bars suitable for use in subsequent physical testing. The results are summarized on Table 2 below.

TABLE 2

| Example: | C1 | C2 |
|---|---|---|
| PPE, I.V. in dl/g | 0.36 | 0.46 |
| Tensile Strength, kpsi. | 3.3 | 3.1 |
| Tensile Modulus, kpsi. | 366 | 329 |
| Elongation, % | 1.5 | 1.1 |
| % extractable PPE | 49 | 45 |
| % reacted | 2 | 9 |
| Vacuum | no | no |

An evaluation of the comparative examples C1 and C2 with those of examples 1-4 tends to show that the use of the phosphorous triscaprolactam acts to significantly improve the tensile strength of molding compositions comprising PPE and polyesters, particularly blends of PPE and poly(ethylene terephthalate). As has been described before, this is attributed to the effects of compatibilization which are achieved by the use of the phosphorous triscaprolactam. Modest improvements in the tensile modulus of blends formed utilizing phosphorous triscaprolactam are also indicated by the physical test result data. Further, comparisons of the percentages of extractable PPE are indicative of the successful reactivity of the PPE in each composition.

EXAMPLE 5

A composition comprising 38.5% of a polyphenylene ether having the characteristics of; Wt.Avg.Mol.Wt. (Mw) of 34800, No.Avg.Mol.Wt. (Mn) of 4800, an intrinsic viscosity (IV) of 0.30, 38.5% of a poly(ethylene terephthalate) having an intrinsic viscosity of 0.7, 10% of a polycarbonate resin which is commercially available from the General Electric Co. under the designation Lexan ® 101, 10% of a Kraton ® rubber, an elastomeric constituent which is commercially available from Shell Chemical Co. under the trade designation "K-FG 1901X" and 3% of a phosphorous triscaprolactam was provided to the Killion 1 inch-extruder and processed to form strands under the conditions of, and in the manner used to form the articles according to Examples 1-4 recited above. The extrudate was injection molded to form Type 2 tensile test bars in accordance with ASTM D-638 requirements and physical testing yielded the following results: repeated notched Izod test of 1.4 ft-lb/in., a tensile modulus of 259 kpsi, a tensile strength of 6.1 kpsi, and an elongation of 23% at break.

COMPARATIVE EXAMPLE C3

Similar to the composition according to that recited as example 5 above, a composition comprising 38.5% of a polyphenylene ether having the characteristics of; Wt.Avg.Mol.Wt. (Mw) of 34800, No.Avg.Mol.Wt. (Mn) of 4800, an intrinsic viscosity (IV) of 0.30, 38.5% of a poly(ethylene terephthalate) having an intrinsic viscosity of 0.7, 10% of a polycarbonate resin which is commercially available from the General Electric Co. under the designation Lexan ® 101, 10% of a Kraton ® as the elastomeric constituent from Shell Chemical and marketed under the trade designation "K-FG 1901X"

and 3% of a triphenyl phosphite was processed using a Killion 1 inch extruder to form strands under the conditions of, and in the manner used to form the products according to Examples 1-5 recited above, the description of which is herein incorporated by reference. In like fashion, the extrudate was afterwards injection molded to form test bars in accordance with ASTM D-638 specifications and physical testing yielded the following results: repeated notched Izod test of 1.2 ft-lb/in., a tensile strength of 5.6 kpsi, and an elongation of 15% at break.

EXAMPLE 6

A blend of 49 parts by weight of a poly(phenylene ether) having an intrinsic viscosity of 0.36 as measured in chloroform, 49 parts by weight of poly(ethylene terephthalate) were tumble blended together in a sealed container with 2 parts by weight of phosphorous triscaprolactam. Afterwards, each of the mixtures were supplied to the feed hopper placed at the throat of a Killion 1 inch single screw extruder outfitted with a two-stage Maddox screw. The extruder barrel had a length to diameter ratio of 30 to 1, and the zones of the barrel were heated to the following temperatures: zone 1, 500-480 deg. F., zone 2, 480 deg. F., zone 3, 500 deg. F., zone 4, between 500-520 deg. F. The extruder included an injection port located 15.5 inches from the throat of the screw and immediately preceeding a high-compression zone, which zone has a length of 8 inches, and the extruder also included a vacuum port near the die. The vacuum port was operated to draw a vacuum approaching 0 mm of mercury. The first exit die was maintained at a temperature of 520 degrees F., and the second die was maintained at a temperature of between 470-540 deg. F. The extruder was outfitted with a 2 stage Maddock screw, and throughout the extrusion the rotational speed of the screw was maintained at a constant of 52 RPM, and the motor drew 5.0 amperes of current to maintain a througput rate of 22 grams per minute of extrudate. The extrudate exiting the die was in the form of strands having a diameter of ¼ inch, and were quickly passed into a water bath to quench and cool the strands. The strands were subsequently pelletized to form a feed stock useful for injection molding. The extrudate so formed was noted to be amber in color. A portion of the pellets so formed were removed, ground to form a fine powder and exhaustively extracted in chloroform in order to remove as much as possible of the unreacted PPE remaining in the extrudate and to determine the amount of extractable PPE in the pelletized extrudate, which was then dried in a vacuum.

The pelletized extrudate was afterwards injection molded to form test bars in accordance with ASTM D-638 specifications. The extruder used was an Arburg Injection molding machine, which was maintained to have a melt temperature of 180 deg. F., and which was set to have the following barrel temperatures: First barrel temperature, 285 deg. C., second barrel temperature, 285 deg. C., third barrel temperature, 280 deg. C. The screw speed was set at 200, with the screw motor set at 18.0 The boost pressure was 1100 psi, the holding pressure 400 psi. For the molding operation, a shot size of 7 lbs was used, and the following times were used: injection time of 0.06 sec, a holding time of 15.0 sec, a cooling time of 10.0 seconds, amd a mold open time of 2.5 sec. The sampled molded were noted to need no additional mold release agents for their removal, showed no warpage on cooling and evidenced no delamination. The physical property testing yielded the results outlined on Table 3 below.

EXAMPLE C4

A blend consisting of 50 parts by weight of a poly(phenylene ether) having an intrinsic viscosity of 0.36 as measured in chloroform, and 50 parts by weight of poly(ethylene terephthalate) were tumble blended together in a sealed container. The sample contained no phosphorous triscaprolactam in its composition. Subsequently, the blend was extruded, pelletized and injection molded in the manner used to form the composition of Example 6 above and subsequently subjected to testing. In a like manner a portion of the extruded pellets were ground and exhaustively extracted with chloroform. The results of the testing are outlined on Table 3 below.

EXAMPLE C5

A blend based on the final composition weight percentages consisting of 48.5 parts by weight of a poly(phenylene ether) having an intrinsic viscosity of 0.36 as measured in chloroform, and 48.5 parts by weight of poly(ethylene terephthalate) were tumble blended together in a sealed container. Subsequently, using the Killion 1 inch single screw extruder used Examples 1-4, the blend was extruded and during the extrusion, 3 parts by weight of triphenylphosphite was injected via the liquid injection port. During the extrusion, the vacuum port of the extruder was maintained at a vacuum of approxiamtely 0 mm of mercury in order to draw off any phenols which were formed during the extrusion process. The extrudate was pelletized and subsequently injection molded in the manner used to form the composition of Example 6 above and subsequently subjected to testing. In a like manner a portion of the extruded pellets were ground and exhaustively extracted with chloroform. The results of the testing are outlined on Table 3 below.

EXAMPLE 7

A blend composition consisting of 49 parts by weight of a preblended mixture formed by coextruding a blend of PPE and Kraton ® FG 1901x (having a ratio of PPE: Kraton ® of 80:20), 10 parts by weight of a poly(carbonate) (Lexan ® 101), 39 parts by weight of poly(ethylene terephthalate) and 2 parts by weight of phosphorous triscaprolactam were supplied to the feed hopper placed at the throat of a Killion 1 inch single screw extruder outfitted with a two-stage Maddox screw as described in conjunction with Example 6. The zones of the barrel were heated to the following temperatures: zone 1, 500-460 deg. F., zone 2, 480 deg. F., zone 3, 500 deg. F., zone 4, between 500-520 deg. F. The extruder included an injection port located 15.5 inches from the throat of the screw and immediately preceeding a high-compression zone, which zone has a length of 8 inches, and the extruder also included a vacuum port near the die. The vacuum port was operated to draw a vacuum approaching 0 mm of mercury. The first exit die was maintained at a temperature of 520 degrees F., and the second die was maintained at a temperature of between 420-540 deg. F. The 2 stage Maddock screw was maintained at a rotational speed of 52 RPM, and the motor drew 4.5 amperes of current to maintain a througput rate of 50 grams per minute of extrudate. The extrudate exiting the die was in the form of strands having a diameter of ¼ inch, and were quickly passed into a water bath to quench and cool the strands. The strands were subsequently pelletized to form a feed stock useful for injection molding. The extrudate so formed was noted to be amber in color. A portion of the pellets were removed, ground to form a fine powder and exhaustively extracted in chloroform in order to remove as much as possible of the unreacted PPE remaining in the extrudate and to determine the amount of extractable PPE in the pelletized extrudate, which was then dried in a vacuum.

The pelletized extrudate was afterwards injection molded to form Type 2 test bars in accordance with ASTM D-638 specifications in the general manner outlined in Example 6 above, and afterwards the samples so formed were subjected to physical testing. The results are outlined on Table 3 below.

EXAMPLE C6

The composition according to Example 7 was replicated with the modification that the phosphorous triscaprolactam was not included in the composition. In the same manner, the extrudate was pelletized and molded into Type 2 test bars and subsequently tested. The results are included in Table 3 below.

TABLE 3

| Example: | 6 | C4 | C5 | 7 | C6 |
| --- | --- | --- | --- | --- | --- |
| PPE, i.v. | 0.36 | 0.36 | 0.36 | 0.36 | 0.36 |
| Extractable PPE, % | — | 50 | 39 | — | — |
| % reacted | — | — | 26 | — | — |
| Tensile Str. (kpsi) | 9.6 | 7.0 | 8.9 | 6.7 | 6.4 |
| Tensile Modulus, (kpsi) | 333 | — | — | 247 | — |
| Flexural Modulus, (kpsi) | — | 349 | 352 | — | 380 |
| Elongation, % | 3.8 | 2 | 3 | 36.6 | 6 |
| Vacuum | yes | yes | yes | yes | yes |

It will be appreciated that the instant specifications and examples set forth herein are by way of illustration and not limitation, and that various modifications and changes may be made without departing from the spirit and scope of the present invention; the limitations of the use of the invention are imposed only by the appendant claims.

What we claim is:

1. A composition comprising:
   a polycarbonate;
   a poly(phenylene ether);
   a polyester; and
   a phosphoroustrislactam.

2. A composition comprising:
   a poly(phenylene ether);
   a polyester;
   a phosphoroustrislactam; and
   a functionalized elastomer.

3. The composition according to claim 2 wherein the poly(phenylene ether) is a derivative of a phenol compound having the formula

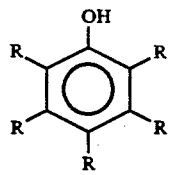

wherein each R is representative of a monovalent substituent selected from the group consisting of hydrogen, halogen, aromatic hydrocarbon, aliphatic hydrocarbon, as well as hydrocarbonoxy radicals which are free of a tertiary alpha carbon atom and a halohydrocarbon and halohydrocarbonoxy radicals free of a tertiary alpha-carbon atom and which comprises at least two carbon atoms between the halogen atom and the phenyl nucleus, and wherein at least one R is hydrogen.

4. The composition according to claim 3 wherein two or more phenol compounds are utilized to derive the poly(phenylene ether).

5. The composition according to claim 3 wherein the poly(phenylene ether) is at least one poly(phenylene ether) having the formula:

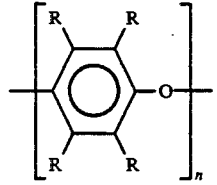

wherein n has a value of 50 or in excess thereof, and R is representative of a monovalent substituent selected from the group consisting of hydrogen, halogen, aromatic hydrocarbon, aliphatic hydrocarbon, as well as hydrocarbonoxy radicals which are free of a tertiary alpha-carbon atom and halohydrocarbon and halohydrocarbonoxy radicals free of a tertiary alpha-carbon atom and which comprises at least two carbon atoms between the halogen atom and the phenyl nucleus, and wherein at least one R is hydrogen.

6. The composition according to claim 2 wherein the poly(phenylene ether) has a number average molecular weight of between about 4800 and 12600.

7. The composition according to claim 2 wherein the poly(phenylene ether) exhibits an intrinsic viscosity (I.V.) of between about 0.3 and 1.0 dl/g when measured in a 60/40 weight percent mixture of phenol/tetrchlorathene.

8. The composition according to claim 2 wherein the polyester is at least one polyester selected from the group consisting of: poly(alkylene terephthalate) resins; poly(ethylene terephthalate), poly(butylene terephthalate), poly(tetramethylene terephthalate), poly(aryl terephthalate) and copolymers and/or mixtures thereof.

9. An article comprising the composition of claim 2.

* * * * *